United States Patent
Borgström et al.

(10) Patent No.: US 11,052,409 B2
(45) Date of Patent: Jul. 6, 2021

(54) CENTRIFUGAL SEPARATOR AND METHOD OF MONITORING AN E-LINE POSITION IN A CENTRIFUGAL SEPARATOR

(71) Applicant: ALFA LAVAL CORPORATE AB, Lund (SE)

(72) Inventors: Leonard Borgström, Tyresö (SE); Peter Thorwid, Sundbyberg (SE)

(73) Assignee: ALFA LAVAL CORPORATE AB, Lund (SE)

( * ) Notice: Subject to any disclaimer, the term of this patent is extended or adjusted under 35 U.S.C. 154(b) by 775 days.

(21) Appl. No.: 15/566,645

(22) PCT Filed: Apr. 22, 2016

(86) PCT No.: PCT/EP2016/058962
§ 371 (c)(1),
(2) Date: Oct. 13, 2017

(87) PCT Pub. No.: WO2016/170091
PCT Pub. Date: Oct. 27, 2016

(65) Prior Publication Data
US 2018/0117601 A1 May 3, 2018

(30) Foreign Application Priority Data
Apr. 24, 2015 (EP) .................... 15165031

(51) Int. Cl.
*B04B 13/00* (2006.01)
*B04B 1/08* (2006.01)
(Continued)

(52) U.S. Cl.
CPC .......... *B04B 13/00* (2013.01); *B01D 17/0217* (2013.01); *B01D 17/12* (2013.01);
(Continued)

(58) Field of Classification Search
CPC .. B04B 13/00; B04B 1/10; B04B 1/08; B04B 11/02; B04B 2013/006; B01D 17/0217; B01D 17/12
(Continued)

(56) References Cited

U.S. PATENT DOCUMENTS 3,179,334 A * 4/1965 Sharples ................... B04B 1/08
494/4
4,042,172 A * 8/1977 Nozdrovsky ............. B04B 3/04
494/53
(Continued)

FOREIGN PATENT DOCUMENTS

CN 1342105 A 3/2002
CN 101171086 A 4/2008
(Continued)

OTHER PUBLICATIONS

International Search Report for PCT/EP2016/058962 (PCT/ISA/210) dated Jul. 6, 2016.
(Continued)

*Primary Examiner* — Charles Cooley
(74) *Attorney, Agent, or Firm* — Birch, Stewart, Kolasch & Birch LLP (57) ABSTRACT

A method of supervising and controlling an E-line position in a centrifugal separator and a centrifugal separator include the E-line positon being continuously calculated based on inter alia, monitored density of light and heavy liquid phases, and monitored pressure at outlet side of light and/or heavy liquid outlet passages. First and/or second valves are controlled to control the E-line position, based on the supervised E-line position.

20 Claims, 4 Drawing Sheets

(51) Int. Cl.
  *B04B 11/02* (2006.01)
  *B04B 1/10* (2006.01)
  *B01D 17/02* (2006.01)
  *B01D 17/12* (2006.01)
(52) U.S. Cl.
  CPC .................. *B04B 1/08* (2013.01); *B04B 1/10* (2013.01); *B04B 11/02* (2013.01); *B04B 2013/006* (2013.01)
(58) Field of Classification Search
  USPC ....... 494/1–3, 10, 37, 53, 54, 56, 57, 68–73; 210/380.1, 380.3
  See application file for complete search history.

(56) References Cited

U.S. PATENT DOCUMENTS

| | | | |
|---|---|---|---|
| 4,525,155 A * | 6/1985 | Nilsson | B04B 1/10 494/10 |
| 5,217,428 A * | 6/1993 | Schlip | B04B 1/20 494/53 |
| 5,593,377 A * | 1/1997 | Figgener | B04B 1/20 494/53 |
| 5,643,169 A * | 7/1997 | Leung | B04B 1/20 494/53 |
| 5,695,442 A * | 12/1997 | Leung | B04B 1/20 494/37 |
| 5,788,622 A * | 8/1998 | Borgstrom | B04B 11/082 494/57 |
| 5,885,202 A * | 3/1999 | Ostkamp | B04B 1/20 494/25 |
| 6,143,183 A | 11/2000 | Wardwell et al. | |
| 6,328,897 B1 | 12/2001 | Leung | |
| 6,616,589 B1 | 9/2003 | Maehans | |
| 7,056,273 B2 * | 6/2006 | Ostkamp | B04B 1/20 494/27 |
| 2003/0093590 A1 | 5/2003 | Fleuter | |
| 2005/0164861 A1 * | 7/2005 | Bruning | B04B 1/20 494/56 |
| 2009/0298666 A1 * | 12/2009 | Trager | B04B 1/10 494/10 |
| 2010/0184579 A1 * | 7/2010 | Trager | B04B 11/02 494/56 |
| 2014/0315704 A1 * | 10/2014 | Miller | B01D 17/12 494/3 |
| 2018/0117601 A1 * | 5/2018 | Borgstrom | B01D 17/12 |

FOREIGN PATENT DOCUMENTS

| | | |
|---|---|---|
| CN | 101687204 A | 3/2010 |
| CN | 102869450 A | 1/2013 |
| DE | 3806742 A1 * | 10/1988 |
| GB | 2 057 309 B | 12/1982 |
| WO | WO 00/74858 A1 | 12/2000 |
| WO | WO 01/90831 A1 | 11/2001 |
| WO | WO 2006/096113 A1 | 9/2006 |
| WO | WO 2011/113850 A1 | 9/2011 |

OTHER PUBLICATIONS

Written Opinion of the International Searching Authority for PCT/EP2016/058962 (PCT/ISA/237) dated Jul. 6, 2016.
English translation of the Chinese Office Action and Search Report dated Dec. 11, 2018 for Application No. 201680023430.2.

* cited by examiner

CENTRIFUGAL SEPARATOR AND METHOD OF MONITORING AN E-LINE POSITION IN A CENTRIFUGAL SEPARATOR

TECHNICAL FIELD

The invention generally relates to supervision and controlling an E-line position in a centrifugal separator. More specifically, the invention relates to a method of supervising an E-line position in a centrifugal separator, a method of controlling an E-line position in a centrifugal separator, and thereto related computer programs and computer program products. The invention further relates to a centrifugal separator in which the E-line position is controlled.

BACKGROUND ART

Inside a rotating rotor of a centrifugal separator, an interface between a heavy liquid phase and light liquid phase is formed. The interface also may be referred to as an E-line. The position of the interface is important for the separation performance of the centrifugal separator. If the interface is positioned too far radially outwards, light liquid phase will escape through an outlet for heavy liquid phase, and vice versa. Moreover, at an optimal position of the interface, the full capacity of the centrifugal separator may be utilised. If the interface is positioned radially inwards from this optimal position, e.g. to avoid that the interface will be positioned too far radially outwards, the full capacity of the centrifugal separator is not utilised.

U.S. Pat. No. 6,143,183 discloses computer control systems for monitoring, diagnosing, operating and controlling various parameters and processes of continuous feed centrifuges. The computer control system actuates at least one of a plurality of control devices based on input from one or more monitoring sensors so as to provide real time continuous operational control. The monitoring sensors may sense process parameters and other parameters located both inside a rotor of the centrifuge and outside or exterior to the centrifuge. The parameters include machine operation parameters and parameters related to the input and output streams of the centrifuge. The monitoring sensors may directly measure a position of an interfaces in the rotor.

U.S. Pat. No. 6,616,589 discloses control equipment for use with a nozzle centrifuge for separating a light phase liquid, a heavy phase liquid, and/or solids from a mixture thereof wherein the separated heavy phase and solids are continuously removed through nozzles that are arranged at the periphery of the rotor of the nozzle centrifuge. Separated light phase liquid is discharged through a central outlet in the rotor. Through a space in the rotor, which communicates with the radially outer part of the rotor separating chamber, liquid may either be supplied under pressure to the rotor or be discharged from the rotor for maintaining an interface layer formed in the separating chamber, between separated light and heavy phases. A supply device and a discharge device are adapted to supply to the rotor and discharge from the rotor, respectively, only so much liquid as is required for said purpose. The discharge device is separated from the supply device, such that discharged liquid need not be subjected to the pressure generated by or maintained in the supply device. The interface layer is controlled by supplying and discharging liquid using constant pressure valves.

US 2009/298666 discloses a separator with a separator drum which has a vertical axis of rotation and which separator, furthermore, has the following: a rotary spindle for driving the separator drum, an inflow pipe for a product to be processed, at least two liquid outlets, one each for a light phase (LP) and a heavy phase (HP). The liquid outlet for the light phase is provided with a paring disc. A separation plate stack is arranged in the separator drum. The liquid outlet for the heavy phase is followed outside the drum by a settable throttle device which has an annular disk, and is designed for displacing the liquid radius R(HP), up to which the heavy phase extends in the drum, by a variation in the outflow cross section for the heavy liquid phase, that is to say by throttling. An influence of pressure drops at the heavy phase outlet and the paring disc, on the heavy phase and light phase outflow radii is mentioned. A not closer described online expert system is allegedly capable of maintaining a stable separation process, even though a fluctuation in the product supply rate and product composition may occur or a density fluctuation of the heavy HP and/or the lighter liquid phase LP may occur. By the measurement of certain flow quantities and/or densities allegedly conclusions can be drawn for setting the throttle device of the heavy phase outlet and/or throttling of the paring disc.

Arranging sensors in a fast rotating rotor of a centrifugal separator as disclosed in U.S. Pat. No. 6,143,183 is problematic. Centrifugal forces and flowing fluids affect the sensors. Moreover, transmission of signals from the fast rotating sensors is difficult. Accordingly, measuring a position of an E-line with sensors in a rotor of a separator is difficult. The approach of using an expert system for throttling at the light phase and heavy phase outlets as disclosed in US 2009/298666 may be a possible alternative. However, US 2009/298666 only mentions such an expert system without providing information about its implementation.

SUMMARY

It is an object of the invention to at least partly overcome one or more of the above-identified limitations of the prior art. In particular, it is an object to supervise a position of an E-line position in a centrifugal separator.

According to an aspect of the invention, the object is achieved by a method of supervising an E-line position in a centrifugal separator configured to separate a heavy liquid phase and a light liquid phase from a liquid feed mixture. The centrifugal separator comprises a rotor, a stack of conical separation disks arranged inside the rotor, an inlet for the liquid feed mixture into the rotor, a first outlet passage for the light liquid phase from the rotor, a second outlet passage for the heavy liquid phase from the rotor. An inlet side of the first outlet passage is arranged at a first radius and an inlet side of the second outlet passage is arranged at a second radius. The method comprising steps of: rotating the rotor at an angular speed, feeding the liquid feed mixture into the rotor, monitoring a density of the light liquid phase, monitoring a density of the heavy liquid phase, monitoring a pressure at an outlet side of the first outlet passage and/or at an outlet side of the second outlet passage, monitoring a first parameter related to a first pressure drop between the E-line position and the outlet side of the first outlet passage, monitoring a second parameter related to a second pressure drop between the E-line position and the outlet side of the second outlet passage, and continuously calculating a parameter related to the E-line position based on: the first radius, the second radius, the angular speed, the monitored density of the light liquid phase, the monitored density of the heavy liquid phase, the monitored pressure at the outlet side of the first outlet passage and/or at the outlet side of the second outlet passage, the monitored first parameter related to a first pressure drop between the E-line position and the outlet side of the first outlet passage, and the monitored second parameter related to a second pressure drop between the E-line position and the outlet side of the second outlet passage.

Since a parameter related to the E-line position is continuously calculated based on the monitored densities of the light liquid phase and the heavy liquid phase, the monitored pressure at the outlet side of the first outlet passage and/or at the outlet side of the second outlet passage, the monitored first parameter and the monitored second parameter, a basis for reliably supervised the E-line position is provided. As a result, the above mentioned object is achieved.

It has been realised by the inventor that the monitoring of these particular parameters makes it possible to continuously calculate a parameter related to the E-line position.

The rotor of the centrifugal separator is rotated about a rotation axis. The first and second radii are measured from the rotation axis to the respective inlet sides of the first and second outlet passages. The light liquid phase flows out of the centrifugal separator through the first outlet passage. The heavy liquid phase flows out of the centrifugal separator through the second outlet passage. The centrifugal separator may be configured to separate a component of higher density than the heavy liquid phase, from the liquid mixture. The component may comprise solid matter and/or sludge. The densities of the light liquid phase and the heavy liquid phase may be directly monitored or indirectly monitored. The term "continuously calculating", in the context of continuously calculating a parameter related to the E-line position, entails that the parameter related to the E-line position is calculated at discrete instances, more or less regularly over time. The frequency of such discrete instances may depend on the temporal variation in composition of liquid feed mixture fed into the centrifugal separator. The parameter related to the E-line position may be the actual radius of the E-line in the rotor. However, other parameters related to the E-line position may alternatively be calculated, such as e.g. a pressure at an outlet for the heavy liquid phase and/or an outlet for the light liquid phase.

According to embodiments, the step of monitoring the density of the light liquid phase may comprise monitoring a temperature of the light liquid phase or of the liquid feed mixture, and the step of monitoring the density of the heavy liquid phase may comprise monitoring a temperature of the heavy liquid phase or of the liquid feed mixture. The step of continuously calculating a parameter related to the E-line position may comprise: calculating the density of the light liquid phase based on the monitored temperature of the light liquid phase or of the liquid feed mixture, and calculating the density of the heavy liquid phase based on the monitored temperature of the heavy liquid phase or of the liquid feed mixture. In this manner densities of the light liquid phase and the heavy liquid phase may be indirectly monitored and may easily be established based on the monitored the temperatures of the light liquid phase and of the heavy liquid phase, or of the liquid feed mixture. In the latter case it is assumed that the temperatures of the light and heavy liquid phases are the same as that of the liquid feed mixture.

According to a further aspect of the present invention there is provided a computer program configured to perform a method of supervising an E-line position in a centrifugal separator according to any one aspect and/or embodiment disclosed herein.

According to a further aspect of the present invention there is provided a computer program product comprising computer readable code configured to cause a control system associated with a centrifugal separator to perform a method of supervising an E-line position in a centrifugal separator according to any one aspect and/or embodiment disclosed herein. Such a computer program product may for instance be a CD-ROM disc, a USB memory device, a hard disc drive, a ROM chip or EPROM chip.

According to a further aspect of the present invention there is provided a method of controlling an E-line position in a centrifugal separator configured to separate a heavy liquid phase and a light liquid phase from a liquid feed mixture, the centrifugal separator comprising a rotor being rotatable about a rotation axis, a stack of conical separation disks arranged inside the rotor, an inlet for the liquid feed mixture into the rotor, a first outlet passage for the light liquid phase from the rotor, a second outlet passage for the heavy liquid phase from the rotor, wherein an inlet side of the first outlet passage is arranged at a first radius and an inlet side of the second outlet passage is arranged at a second radius, wherein the centrifugal separator further comprises a controllable first valve for controlling a pressure at an outlets side of the first outlet passage and/or a controllable second valve for controlling a pressure at an outlet side of the second outlet passage. The method of controlling an E-line position includes a method of supervising an E-line position in a centrifugal separator according to any one aspect and/or embodiment disclosed herein, and further comprises steps of:

increasing a pressure at the outlet side of the second outlet passage using the second valve, and/or reducing a pressure at the outlet side of the first outlet passage using the first valve, if the actual E-line position extends radially outside an E-line position set point. Since the E-line position is reliably supervised as discussed above and the second valve is utilised to increase the pressure at the outlet side of the second outlet passage, and/or the first valve is utilised to decrease the pressure at the first outlet passage, the E-line position is adjusted radially inwardly towards the E-line set point when so required. Moreover, since the E-line position is supervised as discussed above, and accordingly a parameter related to the E-line position is continuously calculated, the E-line position is controlled in a manner, which does not require direct measurement of the actual E-line position. Put differently, the E-line position is controlled based on a calculated parameter related to the E-line position. One of the advantages with the present invention is that it is possible to compensate for an irregular liquid feed mixture temperature into the inlet of the centrifugal separator.

According to embodiments the method of controlling an E-line position may comprise steps of:

reducing a pressure at the outlet side of the second outlet passage using the second valve, and/or increasing a pressure at the outlet side of the first outlet passage using the first valve, if the actual E-line position extends radially inside an E-line position set point. In this manner the E-line position may be adjusted radially outwardly towards the E-line set point when so required.

According to embodiments the pressure at the outlet side of the second outlet passage, or the pressure at the outlet side of the first outlet passage, may be controlled by a manipulated variable of a PI control algorithm for controlling the E-line position in the centrifugal separator. In this manner the E-line position may be controlled with a PI control algorithm by letting the PI control algorithm control the pressure at the outlet side of the second outlet passage, or at the outlet side of the first outlet passage, utilising the E-line position calculated by the method of supervising the E-line position.

According to embodiments the rotor may comprise at least one peripherally arranged nozzle opening for continuously ejecting solid matter and/or sludge from the rotor during rotation of the rotor. The method further may comprise a step of:

adding heavy liquid phase into the rotor if the flow of heavy liquid phase through the at least one nozzle opening exceeds the heavy liquid phase content of the liquid feed mixture.

In this manner the E-line position may be adjusted towards the E-line position set point in a centrifugal separator provided with peripheral nozzle openings for ejecting solid matter and/or sludge from the rotor if the liquid feed mixture should contain too little water. The heavy liquid phase may be added into the rotor e.g. via the second outlet passage, via a separate conduit leading into the peripheral portion of the rotor, or by adding heavy liquid phase to the liquid feed mixture.

According to a further aspect of the invention there is provided a computer program configured to perform a method of controlling an E-line position in a centrifugal separator according to any one aspect and/or embodiments disclosed herein.

According to a further aspect there is provided a computer program product comprising computer readable code configured to cause a control system associated with a centrifugal separator to perform a method of controlling an E-line position in a centrifugal separator according to any one aspect and/or embodiment disclosed herein. Such a computer program product may for instance be a CD-ROM disc, a USB memory device, a hard disc drive, a ROM chip, or an EPROM chip.

According to a further aspect there is provided a centrifugal separator configured to separate a heavy liquid phase and a light liquid phase from a liquid feed mixture. The centrifugal separator comprises a rotor being rotatable about a rotation axis, a stack of conical separation disks arranged inside the rotor, an inlet for the liquid feed mixture into the rotor, a first outlet passage for the light liquid phase from the rotor, and a second outlet passage for the heavy liquid phase from the rotor. An inlet side of the first outlet passage is arranged at a first radius and an inlet side of the second outlet passage is arranged at a second radius. The centrifugal separator further comprises a controllable first valve for controlling a pressure at an outlets side of the first outlet passage and/or a controllable second valve for controlling a pressure at an outlet side of the second outlet passage, and a control system configured to perform a method of controlling an E-line position in a centrifugal separator according to any one aspect and/or embodiment disclosed herein.

According to embodiments the centrifugal separator may be further configured to separate solid matter and/or sludge from the liquid mixture. The rotor may comprise discharge ports for intermittent discharge of the separated solid and/or sludge. In this manner solid matter and/or sludge collected at an inner periphery of the separator bowl may be ejected from the separator bowl through the discharge ports. The discharge ports may be intermittently opened by a control system of the centrifugal separator. In order to achieve an intermittent opening of the discharge ports, the rotor may comprise an upper bowl portion and a lower bowl portion. When the upper and lower bowl portions are separated, the solid matter and/or sludge may flow out through the discharge ports. An intermittent separating of the upper and lower bowl portions may be controlled by the control system.

According to embodiments the centrifugal separator may be further configured to separate solid matter and/or sludge from the liquid mixture. The rotor comprises at least one peripherally arranged nozzle opening for continuously ejecting the solid matter and/or sludge from the rotor during rotation of the rotor. In this manner solid matter and/or sludge may be separated from the liquid mixture and may be continuously discharged through the at least one nozzle opening.

The solid matter and/or sludge forms a component of higher density than the heavy liquid phase, to be separated from the liquid mixture.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1A:
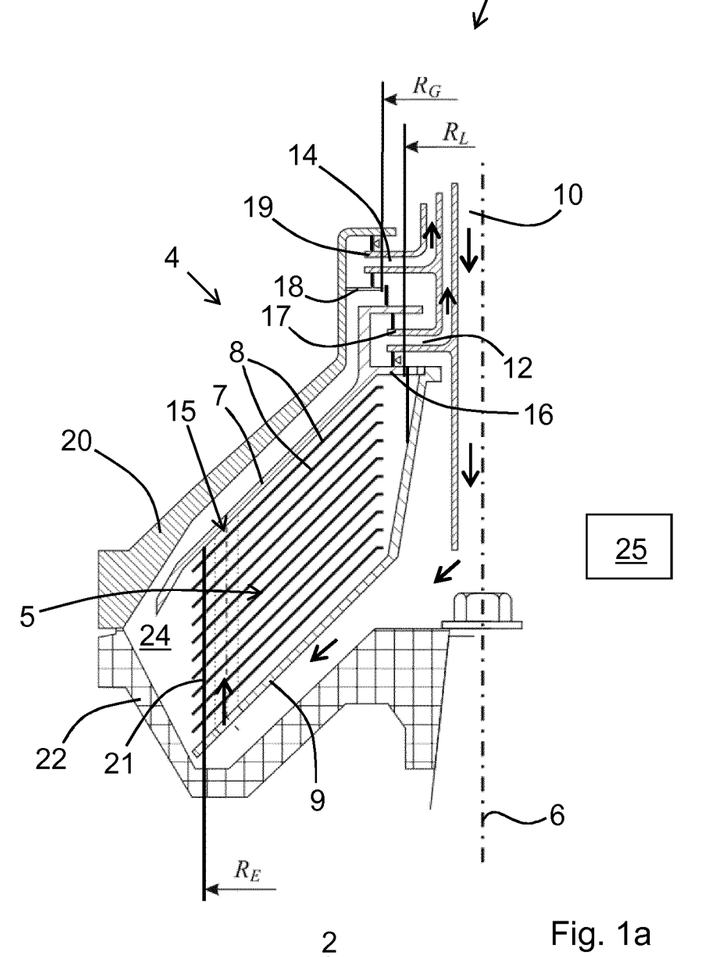
FIGS. 1a and 1b illustrate partial cross sections through portions of centrifugal separators according to embodiments.

FIG. 1a illustrates a partial cross section through a portion of a centrifugal separator 2 according to embodiments. The centrifugal separator 2 comprises a rotor 4 being rotatable about a rotation axis 6 and a stack of conical separation disks 8 arranged inside the rotor 4. The rotor 4 is arranged in a non-shown separator housing. The stack of separation discs 8 is arranged between a top disc 7 and a bottom disc 9, which also may be referred to as a distributor. A separation space 5 is formed between the top disc 7 and the bottom disc 9 in the rotor 4. The centrifugal separator 2 further comprises a centrally arranged inlet 10 into the rotor 4, a first outlet passage 12 from the rotor 4, and a second outlet passage 14 from the rotor 4.

The centrifugal separator 2 is configured to separate a light liquid phase and a heavy liquid phase from a liquid feed mixture. The liquid feed mixture enters the rotor 4 via the inlet 10 during rotation of the rotor 4. The liquid fed mixture flows below the bottom disc 9 to one or more so-called distribution channels 15 formed through the bottom disc 9 and by holes or slots in the separation discs 8. Through the distribution channels 15 the liquid feed mixture is distributed in the stack of separation discs 8 and the separation space 5. In the stack of separation discs 8 the liquid feed mixture is separated into the light liquid phase and the heavy liquid phase. An interface between the light and heavy liquid phases, a so-called E-line 21, is formed in the rotor 4. The light liquid phase flows, or is pumped, from the rotor 4 via the first outlet passage 12. Similarly, the heavy liquid phase flows, or is pumped, from the rotor 4 via the second outlet passage 14. Inter alia, the first and second outlet passages 12, 14 and their particular arrangement determine the radius $R_E$ of the E-line 21 in the centrifugal separator 2. The radius $R_E$ of the E-line 21 may also be referred to as the E-line position.

In this context it may be mentioned that in an intermediate zone between the heavy liquid phase and the light liquid phase there is a concentration gradient. The E-line, equilibrium line, is a simplification of this intermediate zone as a distinct interface between the two liquid phases.

One way of controlling the E-line position is by the use of weirs 16, 18, as in the embodiments illustrated in FIG. 1a. The weir on the light phase side is called a level ring 16 while the weir on the heavy phase side is called a gravity disc 18. The first outlet passage 12 starts at the level ring 16. Accordingly, an inlet side of the first outlet passage 12 is arranged at a first radius $R_L$. Similarly, the second outlet passage 14 starts at the gravity disc 18 and an inlet side of the second outlet passage 14 is arranged at a second radius $R_G$. In these embodiments, the first and second outlet passages 12, 14 each further comprises an outlet member 17, 19 in the form of a paring disc.

According to some embodiments, the centrifugal separator 2 may further be configured to separate solid matter and/or sludge from the liquid feed mixture. The rotor 4 may comprise a separator bowl having an upper bowl portion 20 and a lower bowl portion 22, which may be configured to be intermittently separated from each other during rotation of the rotor 4. Thus, sludge collected in a sludge space 24 of the rotor 4 at an inner periphery of the separator bowl may be ejected from the separator bowl and the rotor 4. The separating of the upper and lower bowl portions 20, 22 may be controlled by a control system 25 of the centrifugal separator 2. Radially outside the upper and lower bowl portions 20, 22, the rotor 4 comprises non-shown discharge ports through which the separated solid matter and/or sludge from the sludge space 24 is intermittently discharge during rotation of the rotor 4. The discharge ports are intermittently opened by the control system 25 of the centrifugal separator 2, which control system 25 is configured to intermittently separate the upper and lower bowl portions 20, 22.

Figure 1B:
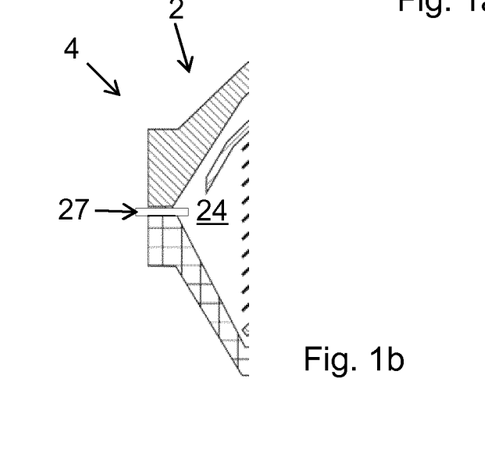

According to alternative embodiments illustrated in FIG. 1b, the rotor 4 may comprise at least one peripherally arranged nozzle opening 27 for continuously ejecting the solid matter and/or sludge from the sludge space 24 of the rotor 4 during rotation of the rotor 4.

According to one embodiment the liquid feed mixture contains oil, water, and solid matter. Accordingly, in such embodiments the light liquid phase is oil and the heavy liquid phase is water. The solid matter may be any non-liquid matter having a higher density than the heavy liquid, i.e. heavier than water in these embodiments. The solid matter and water form sludge, which is collected in the sludge space 24 of the rotor 4, at the largest radial position inside the rotor 4. From the sludge space 24 the sludge is ejected via discharge ports, or nozzle openings as discussed above.

The E-line position is important for the efficiency of the separation of the light and heavy liquid phases in the centrifugal separator 2. For a centrifugal separator 2 where the liquid feed mixture comprises mainly oil with some water and some solid matter, an optimal E-line position is at a radius outside the distribution channels 15. If the E-line position is at a smaller radius, most of the flow goes through the lower part of stack of separation discs 8 and the separation efficiency is far below what may be obtained by the centrifugal separator 2 compared to having the E-line 21 at the optimum E-line position. The disadvantage of maintaining the E-line position at a too large radius is that more light liquid phase, i.e. in this case oil, may escape via the second outlet passage 14, i.e. in this case the outlet for water. Moreover, if the E-line position is located outside the top disc 7, the E-line 21 is "lost" and there is nothing preventing both the light and heavy liquid phases to reach the second outlet passage 14.

Figure 2:
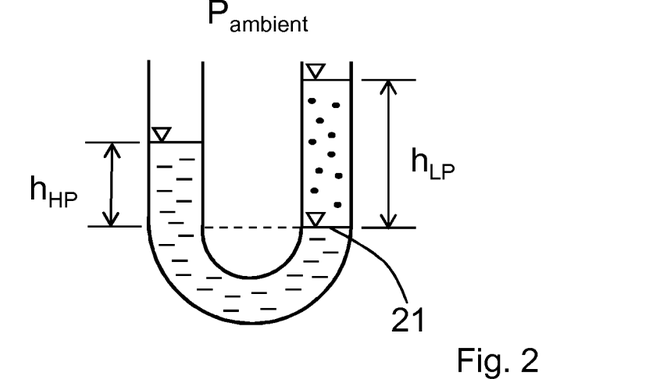
FIG. 2 shows a U-tube with one leg filled with a heavy liquid phase and the other leg filled with a light liquid phase.

A physical theory for determining an E-line position, i.e. a radius $R_E$ of an E-line in a centrifugal separator will now be discussed in more detail. FIG. 2 shows a U-tube with one leg filled with a heavy liquid phase and the other leg filled with a light liquid phase. At the E-line 21 the pressure $P_E$ from the light liquid phase and the pressure from the heavy liquid phase are in equilibrium. This gives the static balance equation (1):

$$P_E = \rho_{HP} h_{HP} g + P_{ambient} = \rho_{LP} h_{LP} g + P_{ambient} \quad (1)$$

where $P_{ambient}$=surrounding air pressure; $\rho_{HP}$, $\rho_{LP}$=heavy and light liquid phase densities; $h_{HP}$, $h_{LP}$=height of heavy and light liquid phase columns; and g=gravitational acceleration.

The corresponding static balance equation (2) for the pressure $P_E$ at the E-line 21 in a rotor 4 of a centrifugal separator 2, as discussed in connection with FIG. 1a and 1b, reads:

$$P_E = \rho_{HP} \cdot \tfrac{1}{2} \omega^2 (R_E^2 - R_G^2) + P_{gasHP} = \rho_{LP} \cdot \tfrac{1}{2} \omega^2 (R_E^2 - R_L^2) + P_{gasLP} \quad (2)$$

where $R_E$=radial position if the E-line; $R_G$=radius of gravity disc 18; $R_L$=radius of level ring 16; $P_{gasHP}$=gas pressure at the heavy liquid phase surface at the gravity disc 18; $P_{gasLP}$=gas pressure at light liquid phase surface at the level ring 16; $\omega$=angular speed of the rotor 4.

In a separator 2 having a level ring 16 and gravity disc 18, it is common practice to select a gravity disc 18 having a suitable radius $R_G$ to achieve a desired radius $R_E$ of the E-line 21 (E-line position) with a given radius $R_L$ of the level disc 16. If the centrifugal separator is designed with ventilations holes for equalization of the gas pressures, the two gas pressures $P_{gasHP}$ and $P_{gasLP}$ are the same. Accordingly, the static balance equation (2) provides the radius $R_G$ for gravity disc 18 in equation (3):

$$R_G = \sqrt{\frac{(\rho_{HP} - \rho_{LP})}{\rho_{HP}} R_E^2 + \frac{\rho_{LP}}{\rho_{HP}} R_L^2} \quad (3)$$

Knowing the densities of the liquid phases $\rho_{LP}$, $\rho_{HP}$, the correct gravity disc radius $R_G$ may be calculated.

A dynamic aspect of the heavy and light liquid phases may further be taken into account to calculate an optimal gravity disc radius $R_G$. Accordingly, flow dependent pressure drops in the light liquid phase and the heavy liquid phase also affect the selection of gravity disc radius $R_G$. (In the examples below account will be taken also to these pressure drops.)

Not all separation processes may be performed under stable conditions, e.g. not all liquid feed mixtures have a composition which is constant over time, or which has the same temperature over time. Accordingly, one or more parameters affecting the separation processes may change during separation of liquid feed mixtures of certain kinds, e.g. during separation of oil and water in a liquid feed mixture having a water content varying over time and/or a liquid feed mixture having a temperature varying over time.

Thus, there is a need to alter the gravity disc radius $R_G$ in order to maintain the desired E-line position, should one or more parameters of the liquid feed mixture change to a certain extent in the centrifugal separator 2 of FIG. 1a. Accordingly, the centrifugal separator 2 has to be stopped and disassembled for changing the gravity disc 18.

Figures 3A, 3B:
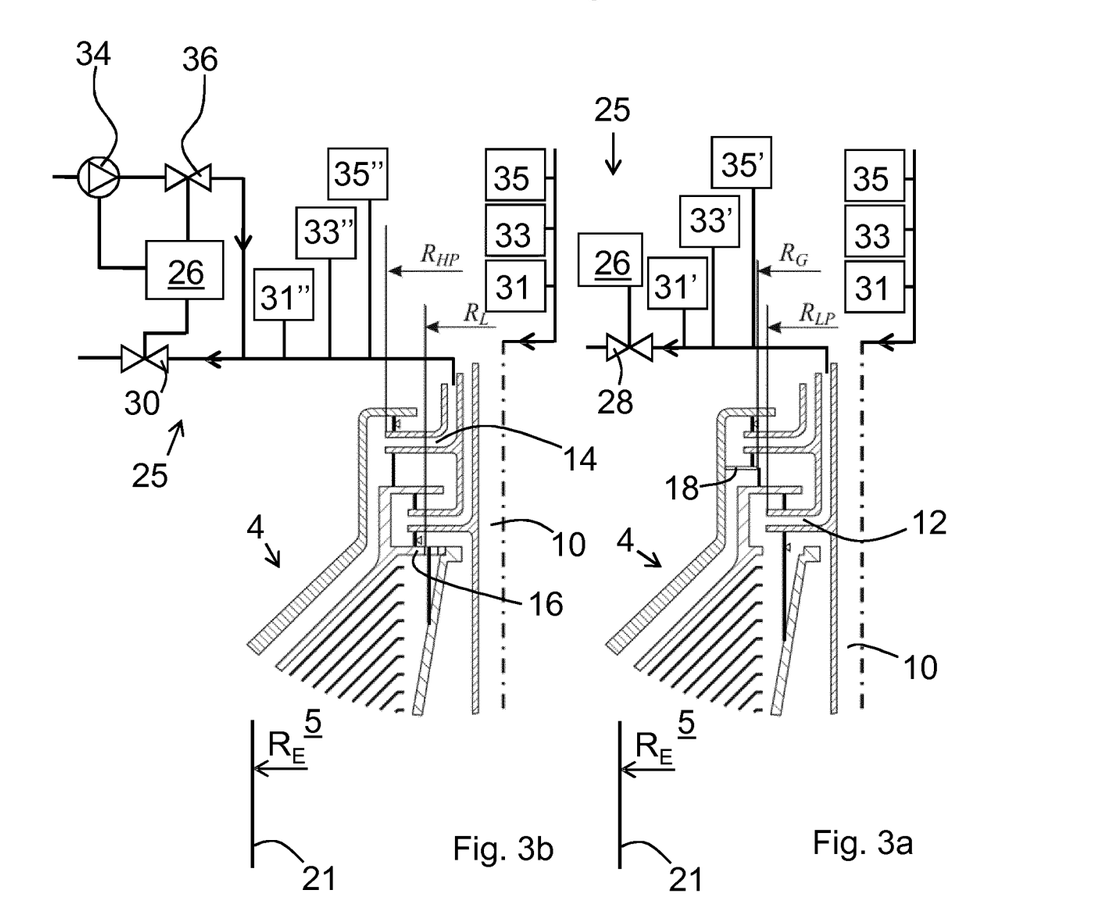
FIGS. 3a and 3b illustrate cross sections through portions of centrifugal separators according to embodiments.

In centrifugal separators of other kinds, the E-line position may be controlled without stopping the centrifugal separator for changing a gravity disc. FIG. 3a illustrates a cross section through a portion of a centrifugal separator 2 according to embodiments. Instead of being provided with a level ring, the centrifugal separator 2 comprises a controllable first valve 28, by means of which the backpressure at an outlet side of the first outlet passage 12 is controllable. Thus, a control system 25 of the centrifugal separator 2 may control the controllable first valve 28 to control the backpressure on the light liquid phase outlet side to maintain the E-line 21 at an optimal radius $R_E$ in the separation space 5. FIG. 3b illustrates a cross section through a portion of a centrifugal separator 2 according to embodiments. Instead of being provided with a gravity disc for controlling the E-line position in the centrifugal separator 2, the centrifugal separator 2 comprises a controllable second valve 30, by means of which the backpressure at an outlet side of the second outlet passage 14 is controllable. Thus, a control system 25 of the centrifugal separator 2 may control the controllable second valve 30 and the backpressure on the heavy liquid phase outlet side to maintain the E-line at an optimal radius $R_E$ in the separation space 5.

Accordingly, in the centrifugal separators 2 of FIGS. 3a and 3b an inlet side of the first outlet passage 12 is arranged at a first radius $R_{LP}$, $R_L$ and an inlet side of the second outlet passage 14 is arranged at a second radius $R_{HP}$, $R_G$. The centrifugal separator 2 of FIG. 3a further comprises a controllable first valve 28 for controlling a pressure at an outlets side of the first outlet passage 12 and the centrifugal separator 2 of FIG. 3b comprises a controllable second valve 30 for controlling a pressure at an outlet side of the second outlet passage 14. The control system 25 may be configured to perform a method of controlling an E-line position in a centrifugal separator 2 according to any one aspect and/or embodiment disclosed herein. In alternative embodiments a centrifugal separator may comprise both controllable first and second valves 28, 30 and neither a level ring 16 nor a gravity disc 18.

The control system 25 may comprise a microprocessor 26 configured to execute computer readable code of a computer program. The computer program may be configured to perform a method of supervising and/or controlling the E-line position in a centrifugal separator. Thus, the microprocessor 26 also may control the pressure at the outlet side of the first and/or second outlet passage 12, 14 by controlling the controllable first and/or second valves 28, 30. Optionally, the control system 25 may control the adding of water into the rotor, see below. The control system 25 may further for example comprise one or more of coriolis type mass flow meters 31, 31', 31", pressure sensors 33, 33', 33", and temperature sensors 35, 35', 35", which communicate with the microprocessor 26 for monitoring/measuring/sensing one or more of density, mass flow, volume flow, fluid pressure, and temperature of the liquid feed mixture, and/or the light liquid phase, and/or the heavy liquid phase.

A physical theory for determining an E-line position, i.e. a radius $R_E$ of an E-line 21 in a centrifugal separator 2 according to FIG. 3b will now be discussed in more detail. Based on the balance equation (2) discussed above, and taking into account the flow dependent pressure drops in the light liquid phase and the heavy liquid phase, a balance equation (4) in the centrifugal separator 2 according to the embodiments to FIG. 3b reads:

$$P_E = \rho_{HP} \cdot \frac{1}{2}\omega^2(R_E^2 - R_{HP}^2) + \Delta P_{HP} + (P_{HP} - \Delta P_{PumpHP}) = \rho_{LP} \cdot \frac{1}{2}\omega^2(R_E^2 - R_L^2) + \Delta P_{LP} + \Delta P_{LR} + P_{gasLP} \quad (4)$$

where $R_{HP}$=radius of inlet side of the second outlet passage 14; $\Delta P_{HP}$=sum of flow dependent pressure drops between the E-line 21 and the inlet side of the second outlet passage 14; $P_{HP}$=backpressure from the second valve 30; $\Delta P_{PumpHP}$=pressure increase created by the paring disc forming the second outlet passage 14; $\Delta P_{LP}$=sum of all flow dependent pressure drops between the E-line and the level ring 16; $\Delta P_{LR}$=pressure drop at level ring 16.

For instance, the radius $R_E$ of the E-line 21 may be calculated using equation (4). Alternatively, the backpressure $P_{HP}$ from the second valve 30 required to set the E-line at a specific radius $R_E$ may be calculate using the equation (4). Accordingly, the E-line position does not have to be physically measured in the rotor of the centrifugal separator, but may instead be calculated. When all of the pressure drops $\Delta P_{HP}$, $\Delta P_{LP}$, $\Delta P_{LR}$ are described by known mathematical functions having input parameters such as light and heavy liquid phase flow rate, fluid viscosity, densities, rotor speed, etc., and $\Delta P_{PumpHP}$ (provided by a pump curve for the paring disc forming the second outlet passage 14), the backpressure $P_{HP}$ required to be provided by the second valve 30 to position the E-line at the radius $R_E$ is given by:

$$P_{HP} = \Delta P_{PumpHP} - \Delta P_{HP} + \Delta P_{LP} + \Delta P_{LR} + P_{gasLP} + \frac{1}{2}\omega^2(\rho_{HP}R_{HP}^2 - \rho_{LP}R_L^2 - (\rho_{HP} - \rho_{LP})R_E^2) \quad (5)$$

If one or more separation parameters vary, as discussed above, controlling the E-line position is suitably done by the control system 25 utilising a control algorithm, such as a PID or PI control algorithm. A desired/optimal E-line position forms an E-line position set point, $R_{E\_sp}$, of the control algorithm. An actual E-line position forms a process value, $R_{E\_pv}$, of the control algorithm. The control algorithm provides values for a manipulated variable, which in these embodiments is a control variable used to set the backpressure $P_{HP}$ by the second valve 30, i.e. the backpressure on the heavy liquid phase outlet. Thus, the control system 25 may continuously set the backpressure $P_{HP}$. A PID control algorithm is given by equation (6):

$$u(t) = K_P \cdot \left( e(t) + \frac{1}{T_I} \int_o^t e(\tau)d\tau + T_D \frac{d}{dt} e(t) \right) \quad (6)$$

where: u(t)=output signal provided to control a process, in these embodiments the signal for controlling the backpressure $P_{HP}$; e(t)=error, i.e. difference between the set point and the process value, in theses embodiments $R_{E\_sp} - R_{E\_pv}$; $K_P$=proportional gain; $T_I$=integration time; $T_D$=derivation time.

Noise may be present in measurement signals. To avoid the noise disturbing the output signal, the derivative value may be eliminated. Thus, a PI control algorithm may be provided by $T_D$=0.

As discussed above, the equation (4) may be utilised to calculate the E-line position. According to the present invention the calculated E-line position, $R_{E\_pv}$, (actual E-line position) is used as a process value forming an input to the PI control algorithm. The balance equation for the E-line 21 gives:

$$R_{E\_pv} = \sqrt{\frac{1}{\rho_{HP} - \rho_{LP}} \left( \begin{array}{c} \rho_{HP} R_{HP}^2 - \rho_{LP} R_L^2 + \\ \frac{2}{\omega^2} \left( \Delta P_{LP} + \Delta P_{LR} + P_{gasLP} - \Delta P_{HP} - \right) \\ (P_{HP} - \Delta P_{PumpHP}) \end{array} \right)} \quad (7)$$

Accordingly, the resulting PI control algorithm for controlling the second valve 30 given by equations (6) and (7), with $T_D=0$ is:

$$u(t) = K_P \cdot \left( e(t) + \frac{1}{T_I} \int_o^t e(\tau) d\tau \right) \quad (8)$$

where $e(t) = R_{E\_sp} - R_{E\_pv}(t)$, and where u(t) is the control signal provided by the control system 25 to the controllable second valve 30 for controlling the backpressure on the heavy liquid phase outlet in order to maintain the E-line position at the E-line set point, $R_{E\_sp}$.

According to alternative embodiments, the PI algorithm may utilise pressure instead of a radial position of the E-line to control the E-line position. In such embodiments equation (9) below, based on equation (5) above, provides the set point pressure, $P_{HP\_sp}$, in the outlet passage 14 of the heavy liquid phase, which set point pressure is required in order to maintain the E-line 21 at the optimal position as parameters of the separation process vary over time. Since parameters of the separation process, such as temperature, density, etc. vary in time, the pressure needed to control the E-line to the set point also is varying in time.

$$P_{HP\_SP} = \Delta P_{PumpHP} - \Delta P_{HP} + \Delta P_{LP} + \Delta P_{LR} + P_{gasLP} + \\ + \frac{1}{2}\omega^2(\rho_{HP} R_{HP}^2 - \rho_{LP} R_L^2 - (\rho_{HP} - \rho_{LP}) R_{E\_SP}^2) \quad (9)$$

The resulting PI algorithm for controlling the second valve 30 given by equations (6) and (9), with $T_D=0$ is:

$$u(t) = K_P \cdot \left( e(t) + \frac{1}{T_I} \int_o^t e(\tau) d\tau \right) \quad (10)$$

where $e(t) = P_{HP\_sp}(t) - P_{HP\_pv}(t)$, and where u(t) is the control signal provided by the control system 25 to the controllable second valve 30 for controlling the backpressure on the heavy liquid phase outlet in order to maintain the E-line 21 at the desired position. $P_{HP\_pv}$ is the actual pressure as sensed by the pressure sensor 33" on the heavy liquid phase outlet.

The reasoning above may be modified to also apply to a centrifugal separator 2 according to the embodiments of FIG. 3a, comprising a controllable first valve 28 on the light liquid phase outlet side and a gravity disc 18 but no level ring. This will lead to equation (11):

$$R_{E\_pv} = \sqrt{\frac{1}{\rho_{HP} - \rho_{LP}} \left( \begin{array}{c} \rho_{HP} R_{HP}^2 - \rho_{LP} R_{LP}^2 + \\ \frac{2}{\omega^2} \left( \Delta P_{LP} + (P_{LP} - \Delta P_{PumpLP}) - \right) \\ \Delta P_G - P_{gasHP} - \Delta P_{HP} \end{array} \right)} \quad (11)$$

where $P_{LP}$=backpressure from the first valve 28; $\Delta P_G$=pressure drop at gravity disc 18.

Using the this $R_{E\_pv}$ in equation (8), u(t) will provide a control signal, by means of which the control system 25 controls the controllable first valve 28 to control the back-pressure on the light liquid phase outlet in order to maintain the E-line position at the E-line set point, $R_{E\_sp}$.

As in the embodiments of FIG. 3b, also in the embodiments of FIG. 3a the PI algorithm may alternatively utilise pressure to control the first valve 28 in order to maintain the E-line at the desired position. Thus, an equation relating to the pressure set point on the light liquid phase outlet side, corresponding to equation (9), may be utilised in the PI control algorithm according to equation (10).

Furthermore, also in the alternative embodiments of a centrifugal separator comprising both controllable first and second valves 28, 30 and neither a level ring 16 nor a gravity disc 18, the reasoning above may be applied, leading to equation (12).

$$R_{E\_pv} = \sqrt{\frac{1}{\rho_{HP} - \rho_{LP}} \left( \begin{array}{c} \rho_{HP} R_{HP}^2 - \rho_{LP} R_{LP}^2 + \\ \frac{2}{\omega^2} \left( \Delta P_{LP} + (P_{LP} - \Delta P_{PumpLP}) - \right) \\ \Delta P_{HP} - (P_{HP} - \Delta P_{PumpHP}) \end{array} \right)} \quad (12)$$

Using the $R_{E\_pv}$ calculated in accordance with equation (12) in the equation (8), u(t) will provide a control signal, by means of which the control system 25 controls the controllable first valve 28 to control the backpressure on the light liquid phase outlet, or the controllable second valve 30 to control the backpressure on the heavy liquid phase outlet, in order to maintain the E-line position at the E-line set point, $R_{E\_sp}$. A control strategy may be devised to determine when the backpressure on the light liquid phase outlet is controlled via the first valve 28, and when the backpressure on the heavy liquid phase outlet is controlled via the controllable second valve 30. According to one example, the control strategy may involve controlling the backpressure only on the heavy liquid phase outlet via the controllable second valve 30 if the difference between the process value and the set point exceeds a threshold value, and controlling the backpressure only on the light liquid phase outlet via the controllable first valve 28 if the difference between the process value and the set point does not exceed the threshold value.

As in the above discussed embodiments of FIGS. 3b and 3a, also in the embodiments with both the first and second valves 28, 30, the PI algorithm may alternatively utilise pressure in order to control the first valve 28 and the second valve 30. Thus, an equation relating to the pressure set point, taking into account the relevant parameters of both the light and heavy liquid phase, corresponding to equation (9), may be utilised in the PI control algorithm according to equation (10).

Depending on the relevant separation process there are various different possible variables. For instance the temperature of the liquid feed mixture may vary. Thus, the density of the light and/or heavy liquid phase may vary. The densities $\rho_{HP}$, $\rho_{LP}$ may be calculated as a function of liquid feed mixture temperature, or as functions of the individual temperatures of the light liquid phase and the heavy liquid phase. Alternatively, the densities $\rho_{HP}$, $\rho_{LP}$ may be measured using a coriolis type mass flow meter or other suitable instrument. The amounts of light and/or heavy liquid phase may vary in the liquid feed mixture. The flow rate of the liquid feed mixture may vary. $R_{HP}$ and $R_{LP}$ are known design parameters of the relevant centrifugal separator. The backpressures $P_{HP}$, $P_{LP}$ are measured. The gas pressures on the light and heavy liquid phase side $P_{gasLP}$, $P_{gasHP}$ may be measured, or may be set as constant values. The different pressures $\Delta P_{LP}$, $\Delta P_{LR}$, $\Delta P_{HP}$, $\Delta P_G$, $\Delta P_{PumpHP}$, and $\Delta P_{PumpHP}$ are functional relationships known to the skilled person and may be calculated from known variables such as rotor speed, flow rates, densities, viscosities, and design parameters. The design parameters relate to the relevant type of centrifugal separator and are known to the skilled person. $\Delta P_{LP}$ is a function of $\rho_{LP}$, $\omega$, light liquid phase flow rate, light liquid phase viscosity and design dimensions of the relevant centrifugal separator. The pressure drop in the stack of separation discs from the E-line positon and inwards to the light liquid phase outlet is included in this pressure drop, $\Delta P_{LP}$, $\Delta P_{HP}$ is a function of $\rho_{HP}$, $\omega$, heavy liquid phase flow rate, heavy liquid phase viscosity and design dimensions. The pressure drop in the stack of separation discs from the E-line position and outwards is included in this pressure drop, $\Delta P_{HP}$, $\Delta P_{PumpHP}$ is a function of $\rho_{HP}$, $\omega$, heavy liquid phase flow rate and design dimensions. $\Delta P_{PumpLP}$ is a function of $\rho_{LP}$, $\omega$, light liquid phase flow rate and design dimensions. $\Delta P_{PumpHP}$ and $\Delta P_{PumpLP}$ may e.g. be provided by relevant pump curves for the paring discs.

The present invention is based around the idea to calculate the E-line position using pressure balance equations, measurable data, and measured or a priori known fluid properties to calculate a radial E-line position or a pressure set point. This calculated radial E-line position, or pressure set point, is used in a control algorithm used to adjust the actual E-line position to a desired E-line position by adjusting a back-pressure on the heavy liquid phase outlet side, or on the light liquid outlet side, or on both the heavy and light liquid outlet sides, as discussed above. This provides a fast and accurate compensation for change in process parameters allowing the E-line position to be maintained at an optimum/desired position at all time.

In the embodiments discussed above with reference to FIG. 3b, the back pressure on the heavy liquid phase outlet side is controlled via the controllable second valve 30 to maintain a desired/optimal E-line position. In the embodiments discussed above with reference to FIG. 3a, the backpressure on the light liquid phase outlet side is controlled via the controllable first valve 28 to maintain a desired/optimal E-line position. In the further embodiments discussed above the control system 25 is configured to control both the first and second valves 28, 30. Moreover, there are centrifugal separators with hermetically mechanically sealed inlets and outlets, often referred to as hermetic inlet and outlet, respectively. Similar balance equations may be set up for such centrifugal separators thus, providing a simulation tool for calculation of the E-line position or pressure in such centrifugal separators. Thus calculated E-line position or pressure is then used in a control algorithm for controlling the E-line position in the same way as in the previously discussed embodiments.

Figure 4:
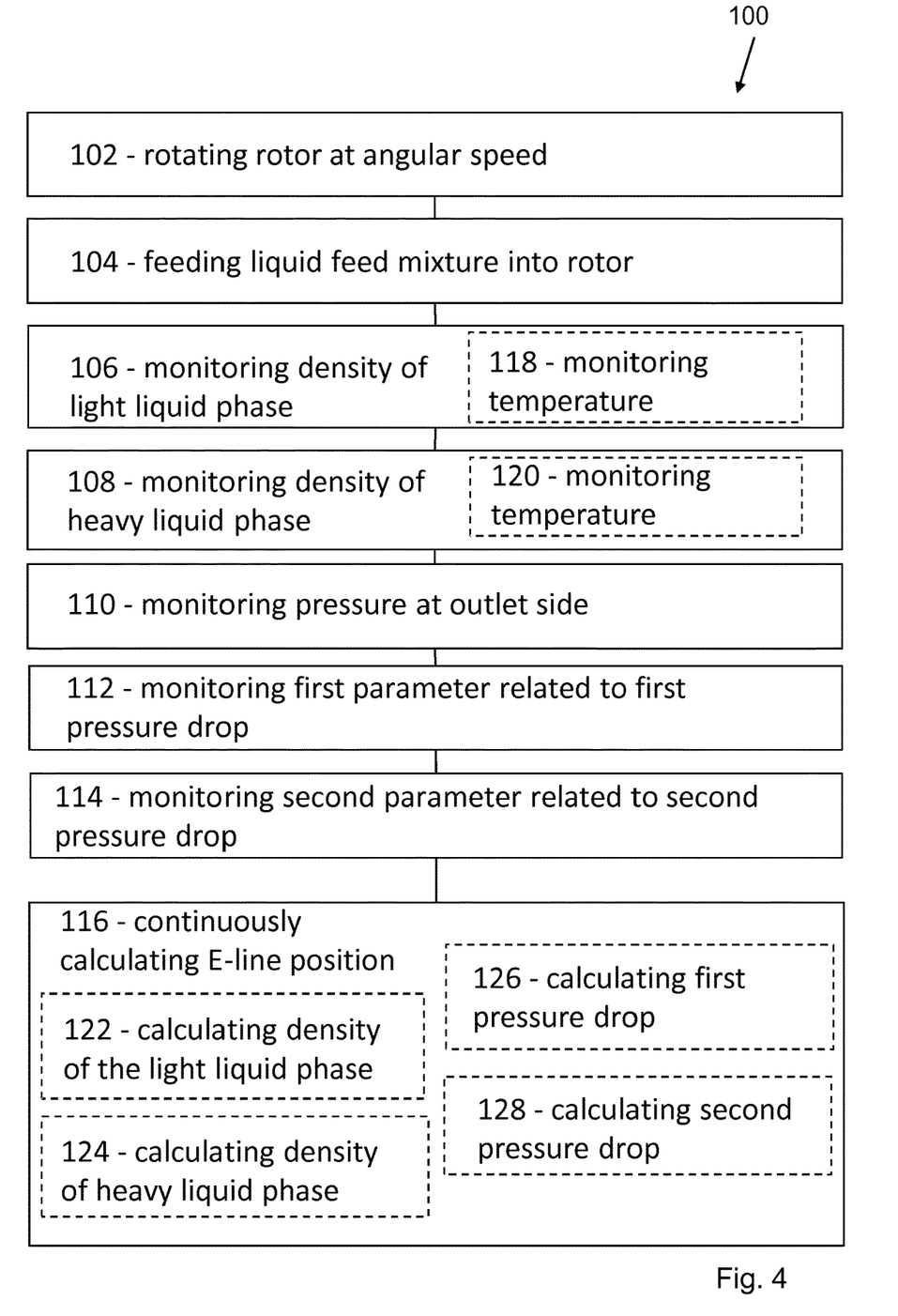
FIG. 4 illustrates a method of supervising an E-line position in a centrifugal separator.

FIG. 4 illustrates a method 100 of supervising an E-line position in a centrifugal separator. The centrifugal separator is configured to separate a heavy liquid phase and a light liquid phase from a liquid feed mixture, and may be a centrifugal separator according to any of the embodiments discussed in connection with FIGS. 3a and 3b. One of the balance equations (7), (11), (12) may be utilised for continuous calculating the actual radius $R_{E\_pv}$ of the E-line position during the supervising of the E-line position. Alternatively, the above discussed equation (9) and corresponding equations for continuously calculating the pressure at the light and/or heavy liquid outlet side may be utilised during the supervising of the E-line position. Accordingly, the centrifugal separator 2 comprises a rotor 4, a stack of conical separation disks 8 arranged inside the rotor 4, an inlet 10 for the liquid feed mixture into the rotor, a first outlet passage 12 for the light liquid phase from the rotor, a second outlet passage 14 for the heavy liquid phase from the rotor. An inlet side of the first outlet passage 12 is arranged at a first radius $R_{LP}$, $R_L$ and an inlet side of the second outlet passage 14 is arranged at a second radius $R_{HP}$, $R_G$.

The method 100 of supervising an E-line position comprises steps of:
  rotating 102 the rotor 4 at an angular speed $\omega$,
  feeding 104 the liquid feed mixture into the rotor 4,
  monitoring 106 a density $\rho_{LP}$ of the light liquid phase,
  monitoring 108 a density $\rho_{HP}$ of the heavy liquid phase,
  monitoring 110 a pressure $P_{LP}$, $P_{HP}$ at an outlet side of the first outlet passage 12 and/or at an outlet side of the second outlet passage 14,
  monitoring 112 a first parameter related to a first pressure drop $\Delta P_{LP}$ between the E-line position and the outlet side of the first outlet passage 12,
  monitoring 114 a second parameter related to a second pressure drop $\Delta P_{HP}$ between the E-line position and the outlet side of the second outlet passage 14, and
  continuously calculating 116 a parameter related to the E-line position, $R_{E\_pv}$, $P_{HP\_sp}$, or corresponding based on: the first radius $R_{LP}$, $R_L$, the second radius $R_{HP}$, $R_G$, the angular speed $\omega$, the monitored density $\rho_{LP}$ of the light liquid phase, the monitored density $\rho_{HP}$ of the heavy liquid phase, the monitored pressure $P_{LP}$, $P_{HP}$ at the outlet side of the first outlet passage 12 and/or at the outlet side of the second outlet passage 14, the monitored first parameter related to a first pressure drop between the E-line position and the outlet side of the first outlet passage, and the monitored second parameter related to a second pressure drop between the E-line position and the outlet side of the second outlet passage.

Mentioned purely as an example, the step of continuously calculating 116 a parameter related to the E-line position may entail that the parameter related to the E-line position is calculated at least 6 times per minute, which calculation frequency may provide a sufficient accuracy for controlling the E-line position. However, a higher calculation frequency may provide a more accurate supervision of the E-line position. Accordingly, the step of continuously calculating 116 a parameter related to the E-line position may entail that the parameter related to the E-line position is calculated up to several times per second.

In embodiments where the centrifugal separator 2 comprises a level ring 16 (FIG. 3b), equation (7) discussed above may be utilised for the step of continuously calculating 116 a parameter related to the E-line position. In embodiments where the centrifugal separator comprises a gravity disc 18 (FIG. 3a), the equation (11) may be utilised for the step of continuously calculating 116 a parameter related to the E-line position. Similarly, in embodiments lacking both a level ring and a gravity disc, the equation (12) may be utilised for the step of continuously calculating 116 a parameter related to the E-line position. As previously discussed for all embodiments equations relating to the set point pressure required to maintain the E-line at the desired/optimal position may alternatively be utilised for the step of continuously calculating 116 a parameter related to the E-line position.

The step of monitoring 106 the density $\rho_{LP}$ of the light liquid phase may comprise monitoring 118 a temperature of the light liquid phase or of the liquid feed mixture, and the step of monitoring 108 the density $\rho_{HP}$ of the heavy liquid phase may comprise monitoring 120 a temperature of the heavy liquid phase or of the liquid feed mixture. The step of continuously calculating 116 a parameter related to the E-line position may comprise: calculating 122 the density of the light liquid phase based on the monitored temperature of the light liquid phase or of the liquid feed mixture, and calculating 124 the density of the heavy liquid phase based on the monitored temperature of the heavy liquid phase or of the liquid feed mixture. For reasonably small temperature changes the density may be calculated using equation (13):

$$\rho = \frac{\rho_{T0}}{(1 + \alpha \times \Delta T)} \quad (13)$$

where $\rho_{T0}$ is the density at a reference temperature, $\alpha$ is the thermal expansion coefficient at temperatures close to $T_0$. Alternative known methods of calculating the density of the light and/or heavy liquid phase as a function of temperature may be used, such as e.g. for calculating the density of water as defined by Kell, Journal of Chemical Engineering Data, Vol. 20, 1975. Calculating 122, 124 the densities of the light and/or heavy liquid phases may include selecting density values from lookup tables, which list the densities of the light and/or heavy liquid phases at various relevant temperatures. Alternatively, or additionally, calculating 122, 124 the densities of the light and/or heavy liquid phases may include interpolating between calculated density values, or between density values from tables, which list the densities of the light and/or heavy liquid phases at various temperatures.

According to embodiments the first parameter related to the first pressure drop may comprise a flow rate of the light liquid phase $Q_{LP}$. The step of continuously calculating 116 a parameter related to the E-line position may comprise calculating 126 the first pressure drop based on the flow rate $Q_{HP}$ of the light liquid phase, the density $\rho_{LP}$ of the light liquid phase, the rotational speed $\omega$, and one or more centrifugal separator specific parameters. Thus, the step of monitoring 112 a first parameter related to a first pressure drop may comprise monitoring the flow rate $Q_{HP}$ of the light liquid phase. The density $\rho_{LP}$ is provided by the step 106. The one or more centrifugal specific parameters depend on the relevant centrifugal separator, and are known to the skilled person. The first pressure drop corresponds to $\Delta_{LP}$ of equation (7).

According to embodiments the second parameter related to the second pressure drop may comprise a flow rate of the heavy liquid phase $Q_{HP}$. The step of continuously calculating 116 a parameter related to the E-line position may comprise calculating 128 the second pressure drop based on the flow rate $Q_{HP}$ of the heavy liquid phase, the density $\rho_{HP}$ of the heavy liquid phase, the rotational speed $\omega$, and one or more centrifugal separator specific parameters. Thus, the step of monitoring 114 a second parameter related to a second pressure drop may comprise monitoring the flow rate $Q_{HP}$ of the heavy liquid phase. The density $\rho_{HP}$ is provided by the step 108. The one or more centrifugal specific parameters depend on the relevant centrifugal separator, and are known to the skilled person. The second pressure drop corresponds to $\Delta P_{HP}$ of equation (7).

A computer program may be configured to perform a method of supervising an E-line position in a centrifugal separator as discussed above.

Figure 6:
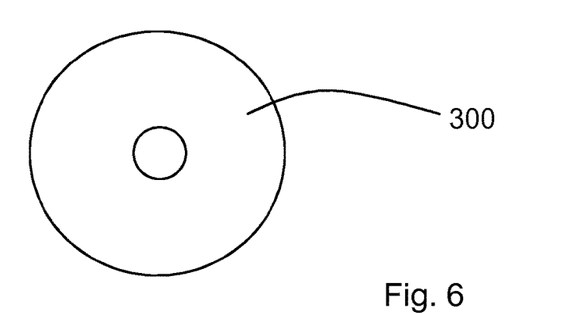

FIG. 6 illustrates a computer program product according to embodiments comprising a CD-ROM disc 300. The computer program product comprises computer readable code configured to cause a control system associated with a centrifugal separator to perform a method of supervising an E-line position in a centrifugal separator as discussed above. Such a computer program product may for instance be a CD-ROM disc, a USB memory device, a hard disc drive, a ROM or an EPROM chip.

Figure 5:
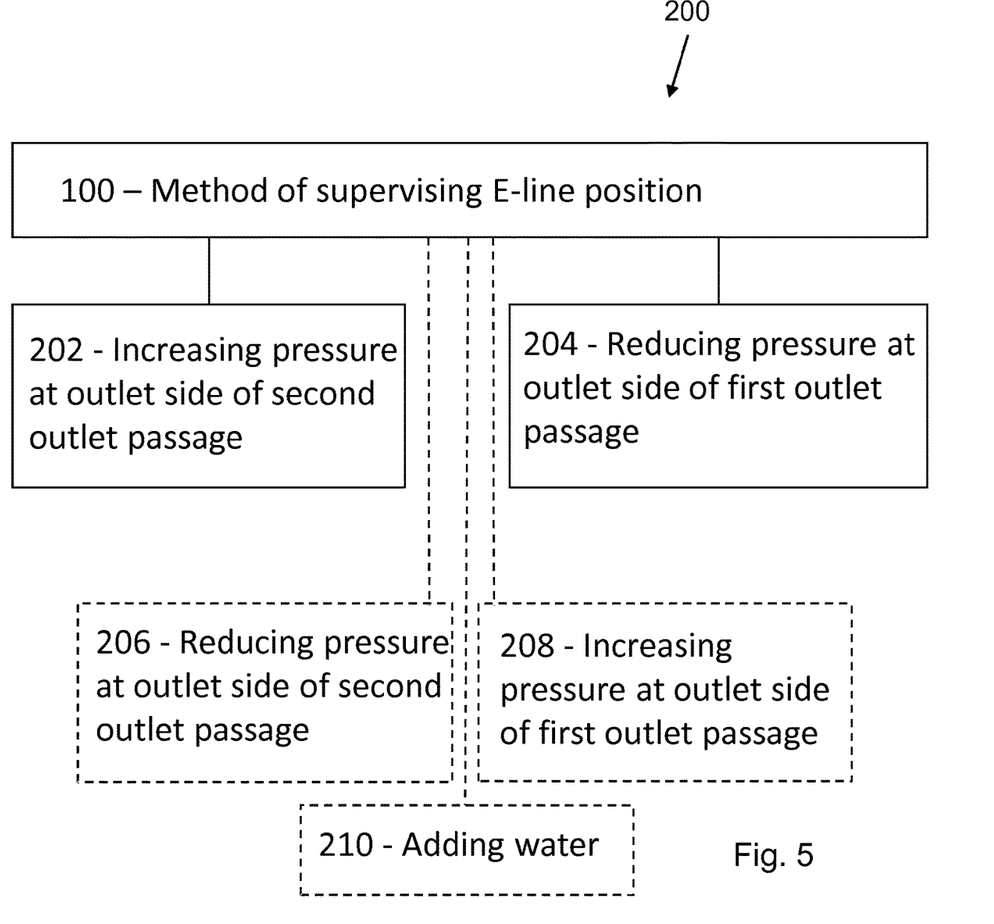
FIG. 5 illustrates a method of controlling an E-line position in a centrifugal separator.

FIG. 5 illustrates a method 200 of controlling an E-line position in a centrifugal separator configured to separate a heavy liquid phase and a light liquid phase from a liquid feed mixture. The centrifugal separator may be a centrifugal separator 2 according to any of the embodiments discussed in connection with FIGS. 3a and 3b. One of the balance equations (7), (11), (12) may be utilised for continuous calculating the actual radius $R_{E\_pv}$ of the E-line position during the supervising of the E-line position. Alternatively, the above discussed equation (9), or corresponding equations, for continuously calculating the pressure at the light and/or heavy liquid outlet side may be utilised during the supervising of the E-line position. The centrifugal separator 2 comprises a rotor 4 being rotatable about a rotation axis 6, a stack of conical separation disks 8 arranged inside the rotor 4, an inlet 10 for the liquid feed mixture into the rotor 4, a first outlet passage 12 for the light liquid phase from the rotor 4, a second outlet passage 14 for the heavy liquid phase from the rotor 4, wherein an inlet side of the first outlet passage 12 is arranged at a first radius $R_{LP}$, $R_L$ and an inlet side of the second outlet passage 14 is arranged at a second radius $R_{HP}$, $R_G$, wherein the centrifugal separator 2 further comprises a controllable first valve 28 for controlling a pressure $P_{LP}$ at an outlets side of the first outlet passage 12, and/or a controllable second valve 30 for controlling a pressure $P_{HP}$ at an outlet side of the second outlet passage 14, the method 200 of controlling an E-line position including a method 100 of supervising an E-line position in a centrifugal separator according to any one aspect and/or embodiment discussed above, and further comprising steps of:

Increasing 202 the pressure $P_{HP}$ at the outlet side of the second outlet passage 14 using the second valve 30, and/or reducing 204 a pressure $P_{LP}$ at the outlet side of the first outlet passage 12 using the first valve 28, if the actual E-line position $R_{E\_pv}$ extends radially outside an E-line position set point $R_{E\_sp}$. Thus, the E-line position is controlled based on the supervised E-line position calculated according to the method 100 of supervising an E-line positon as discussed above.

The method 200 of controlling an E-line position may further comprise steps of:

reducing 206 a pressure $P_{HP}$ at the outlet side of the second outlet passage 14 using the second valve 30, and/or increasing 208 a pressure $P_{LP}$ at the outlet side of the first outlet passage 12 using the first valve 28, if the actual E-line position $R_{E\_pv}$ extends radially inside an E-line position set point $R_{E\_sp}$. Thus, the E-line position is controlled based on the supervised E-line position calculated according to the method 100 of supervising an E-line positon as discussed above.

The pressure $P_{HP}$ at the outlet side of the second outlet passage 14, and/or the pressure $P_{LP}$ at the outlet side of the first outlet passage 12 may be controlled by a manipulated variable of a PI control algorithm for controlling the E-line position in the centrifugal separator. Thus, the pressure at the outlet side of the second outlet passage, or the pressure at the outlet side of the first outlet passage, may be controlled based on equation (8) discussed above, or corresponding equations, in order to reliably control the E-line position at a desired set point $R_{E\_sp}$.

According to embodiments the rotor 4 comprises at least one peripherally arranged nozzle opening 27 for ejecting the solid matter and/or sludge from the rotor 4 during rotation of the rotor 4, as discussed in connection with FIG. 1b. The method 200 of controlling an E-line position may further comprising a step of: adding 210 heavy liquid phase into the rotor 4 if the flow of heavy liquid phase through the at least one nozzle opening 27 exceeds the heavy liquid phase content of the liquid feed mixture.

Thus, pure heavy liquid phase is added into the rotor 4 to prevent the E-line from moving too far radially outwardly, which would entail that light liquid phase flows out of the rotor 4 via the second outlet passage 14, and even through the at least one nozzle opening 27.

According to some embodiments, the liquid feed mixture may comprise water and oil. In such embodiments water is added into the rotor 4 in the step of adding 210 heavy liquid phase into the rotor 4 if the liquid feed mixture should contain too little water. Water may be added for instance via the second outlet passage 14, or via a pump 34 and a valve 36 controlled by the control system 25, as illustrated in FIG. 3b. Such adding of water is further discussed in U.S. Pat. No. 6,616,589, which is incorporated herein by reference. If water is added into the rotor in this manner, the temperature of the water, i.e. of the heavy liquid phase, for the purpose of supervising and/or controlling the E-line position is determined by the temperature of the mixed water, i.e. the mixture of added water and water of the liquid feed mixture.

A decreasing pressure at the heavy liquid phase outlet may indicate that the heavy liquid phase content of the liquid feed mixture is decreasing, which requires the adding 210 of heavy liquid phase. At a threshold heavy liquid phase pressure value heavy liquid phase may be added into the rotor. Heavy liquid phase may be added at increasing rate if the pressure at the heavy liquid phase outlet continues to decrease from the threshold heavy liquid phase pressure value. If the pressure at the heavy liquid phase outlet increases again, adding of heavy liquid phase may be decreased and finally stopped. Alternatively, a threshold level of the E-line position may indicate that the heavy liquid phase content of the liquid feed mixture is decreasing, which requires the adding 210 of heavy liquid phase. The threshold level of the E-line position may for instance be set at the outer radius of the stack of separation discs 8.

A computer program may be configured to perform the method 200 of controlling an E-line position in a centrifugal separator according to any one aspect and/or embodiments disclosed herein.

FIG. 6 illustrates a computer program product according to embodiments comprising a CD-ROM disc 300. The computer program product comprises computer readable code configured to cause a control system associated with a centrifugal separator to perform a method of controlling an E-line position in a centrifugal separator according to any one any one aspect and/or embodiment disclosed herein. The control system may be a control system 25 as discussed in connection with FIGS. 3a and 3b.

From the description above follows that, although various embodiments of the invention have been described and shown, the invention is not restricted thereto, but may also be embodied in other ways within the scope of the subject-matter defined in the following claims.

The invention claimed is:

1. A method of supervising an E-line position in a centrifugal separator configured to separate a heavy liquid phase and a light liquid phase from a liquid feed mixture, the centrifugal separator comprising a rotor, a stack of conical separation disks arranged inside the rotor, an inlet for the liquid feed mixture into the rotor, a first outlet passage for the light liquid phase from the rotor, a second outlet passage for the heavy liquid phase from the rotor, wherein an inlet side of the first outlet passage is arranged at a first radius ($R_{LP}$, $R_L$) and an inlet side of the second outlet passage is arranged at a second radius ($R_{HP}$, $R_G$), the method comprising steps of:

rotating the rotor at a rotational speed ($\omega$),
feeding the liquid feed mixture into the rotor,
monitoring a density ($\rho_{LP}$) of the light liquid phase,
monitor a density ($\rho_{HP}$) of the heavy liquid phase,
monitoring a pressure ($P_{LP}$, $P_{HP}$) at an outlet side of the first outlet passage and/or at an outlet side of the second outlet passage,
monitoring a first parameter related to a first pressure drop ($\Delta P_{LP}$) between the E-line position and the outlet side of the first outlet passage,
monitoring a second parameter related to a second pressure drop ($\Delta P_{HP}$) between the E-line position and the outlet side of the second outlet passage,
determining an optimal E-line position and forming an E-line position set point based upon the optimal E-line position,
continuously calculating the E-line position based on:
the first radius ($R_{LP}$, $R_L$),
the second radius ($R_{HP}$, $R_G$),
the rotational speed ($\omega$),
the monitored density ($\rho_{LP}$) of the light liquid phase,
the monitored density ($\rho_{HP}$) of the heavy liquid phase,
the monitored pressure ($P_{LP}$, $P_{HP}$) at the outlet side of the first outlet passage and/or at the outlet side of the second outlet passage,
the monitored first parameter related to a first pressure drop ($\Delta P_{LP}$) between the E-line position and the outlet side of the first outlet passage, and
the monitored second parameter related to a second pressure drop ($\Delta P_{HP}$) between the E-line position and the outlet side of the second outlet passage; and
adjusting the pressure at one of the outlet side of the second outlet passage or the outlet side of the first outlet passage to radially align the E-line position with the E-line position set point.

2. The method according to claim 1, wherein the step of monitoring the density ($\rho_{LP}$) of the light liquid phase comprises monitoring a temperature of the light liquid phase or of the liquid feed mixture, wherein the step of monitoring the density ($\rho_{HP}$) of the heavy liquid phase comprises monitoring a temperature of the heavy liquid phase or of the liquid feed mixture, and wherein the step of continuously calculating the E-line position further comprises:
calculating the density ($\rho_{LP}$) of the light liquid phase based on the monitored temperature of the light liquid phase or of the liquid feed mixture, and
calculating the density ($\rho_{HP}$) of the heavy liquid phase based on the monitored temperature of the heavy liquid phase or of the liquid feed mixture.

3. The method according to claim 2, wherein the first parameter related to the first pressure drop ($\Delta P_{LP}$) comprises a flow rate of the light liquid phase ($Q_{LP}$), and wherein the step of continuously calculating the E-line position further comprises calculating the first pressure drop ($\Delta P_{LP}$) based on the flow rate ($Q_{LP}$) of the light liquid phase, the density ($\rho_{LP}$) of the light liquid phase, and the rotational speed.

4. The method according to claim 2, wherein the second parameter related to the second pressure drop ($\Delta P_{LP}$) comprises a flow rate of the heavy liquid phase ($Q_{HP}$), and wherein the step of continuously calculating the E-line position further comprises calculating the second pressure drop ($\Delta P_{HP}$) based on the flow rate ($Q_{HP}$) of the heavy liquid phase, the density ($\rho P_{LP}$) of the heavy liquid phase, and the rotational speed.

5. A computer program embodied on a non-transitory computer readable medium and configured to perform a method of supervising the E-line position in the centrifugal separator according to claim 2.

6. The method according to claim 1, wherein the first parameter related to the first pressure drop ($\Delta P_{LP}$) comprises a flow rate of the light liquid phase ($Q_{LP}$), and wherein the step of continuously calculating the E-line position further comprises calculating the first pressure drop ($\Delta P_{LP}$) based on the flow rate ($Q_{LP}$) of the light liquid phase, the density ($\rho_{LP}$) of the light liquid phase, and the rotational speed.

7. The method according to claim 6, wherein the second parameter related to the second pressure drop ($\Delta P_{HP}$) comprises a flow rate of the heavy liquid phase ($Q_{HP}$), and wherein the step of continuously calculating the E-line position further comprises calculating the second pressure drop ($\Delta P_{HP}$) based on the flow rate ($Q_{HP}$) of the heavy liquid phase, the density ($\rho_{LP}$) of the heavy liquid phase, and the rotational speed.

8. A computer program embodied on a non-transitory computer readable medium and configured to perform a method of supervising the E-line position in the centrifugal separator according to claim 6.

9. The method according to claim 1, wherein the second parameter related to the second pressure drop ($\Delta P_{HP}$) comprises a flow rate of the heavy liquid phase ($Q_{HP}$), and wherein the step of continuously calculating the E-line position further comprises calculating the second pressure drop ($\Delta P_{HP}$) based on the flow rate ($Q_{HP}$) of the heavy liquid phase, the density ($\rho_{LP}$) of the heavy liquid phase, and the rotational speed.

10. A computer program embodied on a non-transitory computer readable medium and configured to perform the method of supervising the E-line position in a centrifugal separator according to claim 1.

11. A computer program product comprising computer readable code embodied on a non-transitory computer readable medium and configured to cause a control system associated with a centrifugal separator to perform the method of supervising the E-line position in a centrifugal separator according to claim 1.

12. The method according to 1, wherein adjusting the pressure at one of the outlet side of the second outlet passage or the outlet side of the first outlet passage comprises increasing the pressure at the outlet side of the second outlet passage using a second valve, and/or reducing the pressure at the outlet side of the first outlet passage using a first valve, if the E-line position extends radially outside the E-line position set point.

13. A computer program embodied on a non-transitory computer readable medium and configured to perform the method of controlling the E-line position in a centrifugal separator according to claim 12.

14. A computer program product comprising computer readable code embodied on a non-transitory computer readable medium and configured to cause a control system associated with a centrifugal separator to perform the method of controlling the E-line position in a centrifugal separator according to claim 12.

15. The method according to claim 1, wherein adjusting the pressure at one of the outlet side of the second outlet passage or the outlet side of the first outlet passage comprises reducing the pressure at the outlet side of the second outlet passage using the second valve, and/or increasing the pressure at the outlet side of the first outlet passage using a first valve if the E-line position extends radially inside the E-line position set point.

16. The method according to claim 1, wherein the pressure ($P_{HP}$) at the outlet side of the second outlet passage or the pressure ($P_{LP}$) at the outlet side of the first outlet passage is controlled by a manipulated variable of a PI control algorithm for controlling the E-line position in the centrifugal separator.

17. The method according to claim 1, wherein the rotor comprises at least one peripherally arranged nozzle opening for continuously ejecting solid matter and/or sludge from the rotor during rotation of the rotor, the method further comprising a step of:

adding heavy liquid phase into the rotor if the flow of heavy liquid phase through the at least one nozzle opening exceeds the heavy liquid phase content of the liquid feed mixture.

18. A centrifugal separator configured to separate a heavy liquid phase and a light liquid phase from a liquid feed mixture, the centrifugal separator comprising a second radius ($R_{HP}$, $R_G$) wherein the centrifugal separator further comprises a controllable first valve for controlling a pressure ($P_{HP}$) at the outlet side of the first outlet passage, and/for a controllable second valve for controlling a pressure ($P_{HP}$) at the outlet side of the second outlet passage, and a control system configured to perform the method of controlling the E-line position in the centrifugal separator according to claim 1.

19. The centrifugal separator according to claim 18, wherein the centrifugal separator is farther configured to separate solid matter and/or sludge from the liquid mixture, wherein the rotor comprises discharge ports for intermittent discharge of the separated solid and/or sludge from the liquid mixture.

20. The centrifugal separator according to claim 18, wherein the centrifugal separator is further configured to separate solid matter and/or sludge from the liquid mixture, wherein the rotor comprises at least one peripherally arranged nozzle opening for continuously ejecting the solid matter and/or sludge from the rotor during rotation of the rotor.

* * * * *